March 3, 1964 J. W. MICHEL 3,123,532
CONTROL ROD POSITIONED BY FLUID FLOW THROUGH THE ROD CHANNEL
Filed May 6, 1963 2 Sheets-Sheet 1

INVENTOR.
John W. Michel
BY
ATTORNEY.

United States Patent Office 3,123,532
Patented Mar. 3, 1964

3,123,532
CONTROL ROD POSITIONED BY FLUID FLOW
THROUGH THE ROD CHANNEL
John W. Michel, Oak Ridge, Tenn., assignor to the United
States of America as represented by the United States
Atomic Energy Commission
Filed May 6, 1963, Ser. No. 278,500
5 Claims. (Cl. 176—36)

This invention relates generally to neutronic reactors and more particularly to a control rod drive system for use in neutronic reactors.

Characteristic of most neutronic reactors is the use of neutron absorbing control rods to regulate and control the neutron chain reaction contained therein. The control rods are generally disposed to move vertically into and out of the reactor core and are moved through the use of electro-mechanical drive units with direct mechanical linkages. Electro-mechanical units, however, are inherently complex and costly and require considerable space. The complex nature of such control rod drive units decreases their reliability and increases the time and expense required for maintenance operations. Inasmuch as reactor operation is highly dependent upon the proper functioning of its control rods, the safety and economy of operation of reactors which utilize complex electro-mechanical control rod drive systems is reduced. The cost and space requirements of electro-mechanical drive units restrict the number and spacing of control rods which can be used in a single reactor. Use of a limited number of widely spaced control rods gives rise to undesirable perturbations in the neutron flux distribution, and forces a higher degree of reliability on each control rod.

A further undesirable limitation of electro-mechanical drive systems is their inability to operate in very high temperature or radiation environments. This operating limitation necessitates the isolation of control rod drives from the high temperature and radiation zones characteristic of most reactors.

It is, therefore, a general object of this invention to provide a control rod drive system of simplified design.

Another object of this invention is to provide a control rod drive system having inherent safety features.

Another object of this invention is to provide a control rod drive system which will permit the use of closely spaced control rod channels.

Still another object of this invention is to provide a control rod drive system capable of operation in a high temperature environment.

A further object of this invention is to provide a control rod drive system capable of operation in an intense radiation environment.

Figure 1:
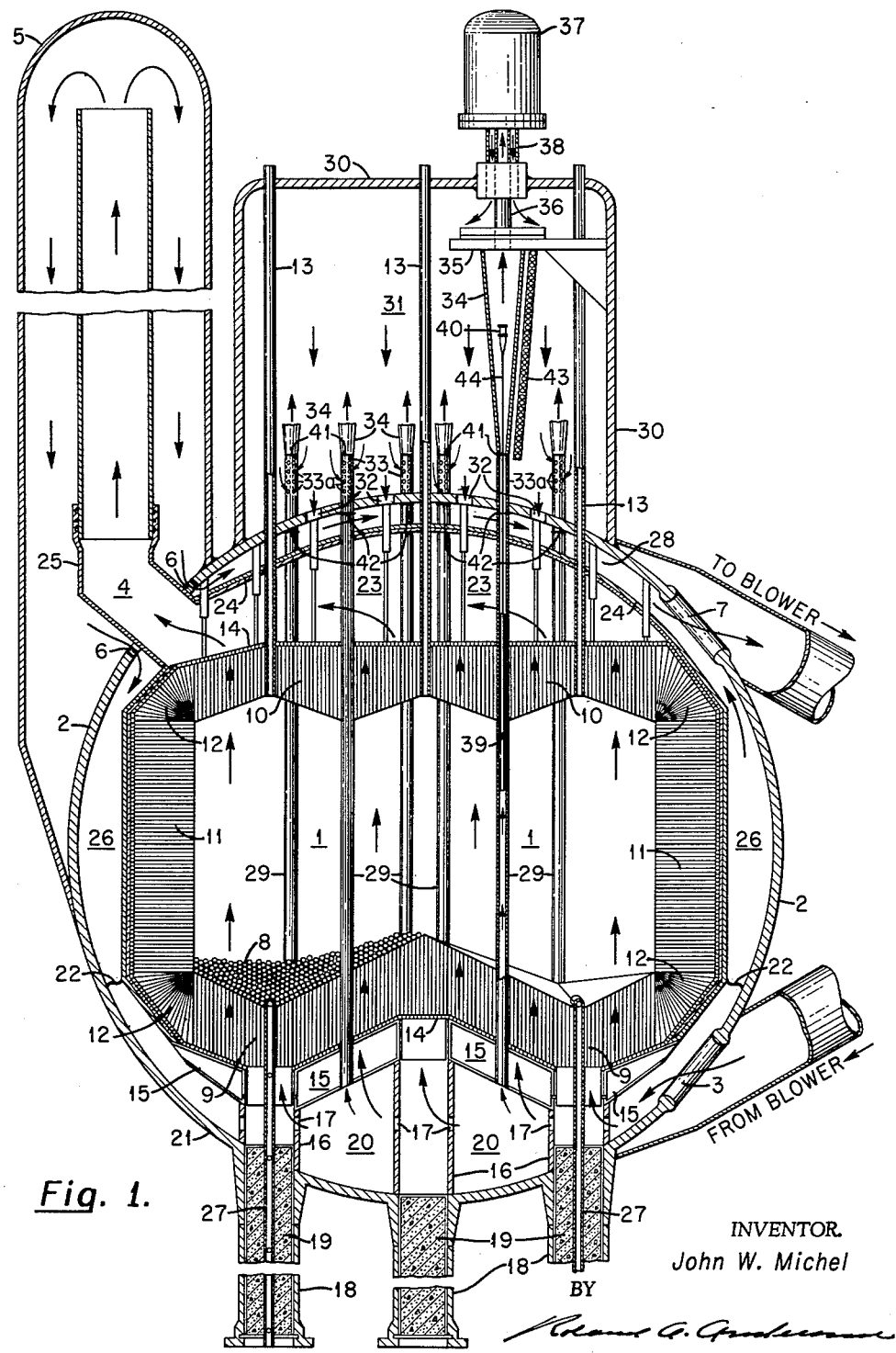
Figure 2:
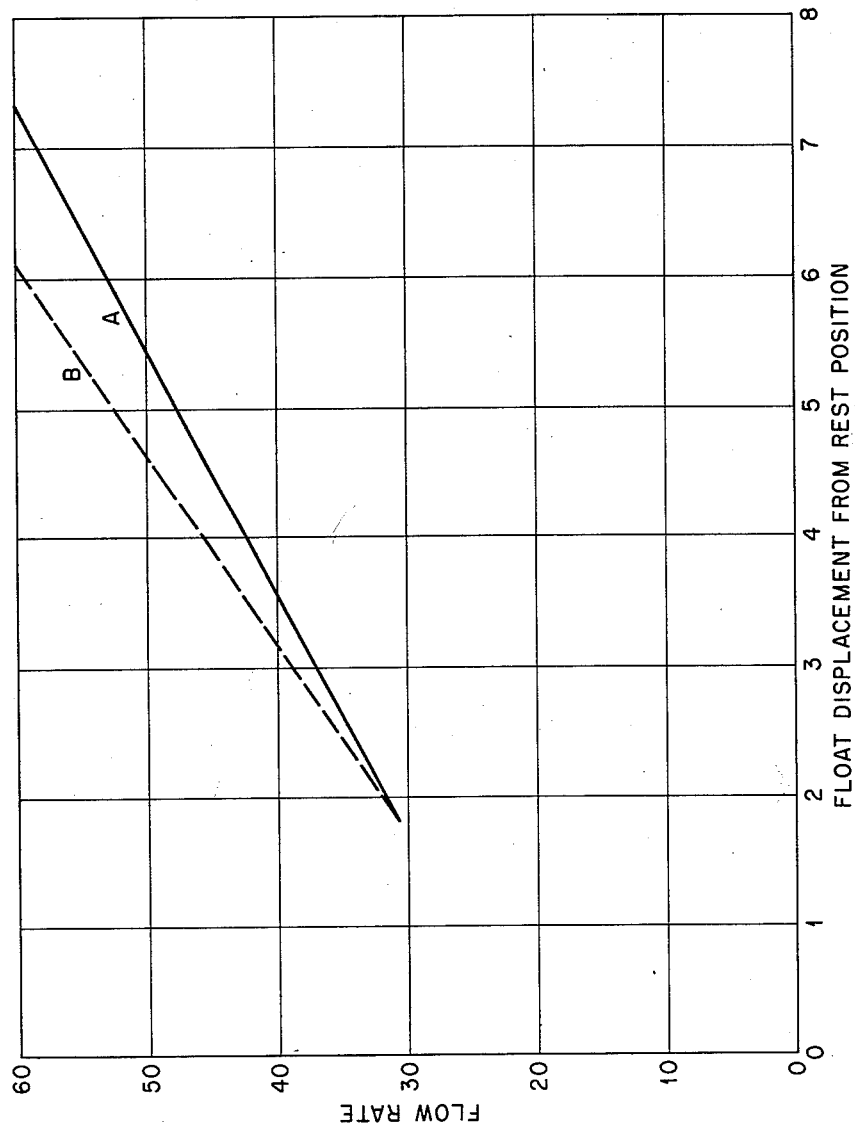

Other objects of this invention will be apparent from an examination of the following description of the invention and the appended drawings, wherein:

FIG. 1 is an illustration of a gas cooled reactor utilizing an embodiment of the subject control rod drive system, and FIG. 2 is a graph illustrating the performance characteristics of control rod drives constructed according to the subject invention.

In accordance with the principles of the present invention, the above objects are attained by a control rod drive system comprising an outwardly tapered tube member coaxially mounted atop each control rod channel, fluid inlet means at the bottom of the tapered tube member, fluid pumping means of variable capacity adapted to pump fluid upwardly through the outwardly tapering tube member, a float member disposed within the tapered tube member and adapted to change its vertical position in response to variations in the fluid flow rate through the tapered tube member, connecting means communicating between the float member and the corresponding control rod, and float position indicating means adapted to indicate the vertical position of the float member, thereby indicating the corresponding control rod position.

To illustrate the invention in greater detail, reference is made to the drawings, initially to FIG. 1, which is a vertical cross sectional view of the reactor disclosed in an application of common assignee, Serial No. 107,603, filed May 3, 1961, now U.S. Patent No. 3,100,187, adapted to use applicant's control rod system. A substantially cylindrical reactor core 1 is enclosed by a spherical pressure shell 2 which is provided with a cool-gas inlet 3 from a blower (not shown), a hot-gas outlet 4 to a load such as the schematically illustrated steam generator 5, a concentric cool-gas return inlet 6, and a cool-gas return outlet 7 to the low pressure side of the blower. Core 1 is made up of a multiplicity of small diameter graphite spheres containing a fissionable material such as $U^{235}$, a portion of which are indicated by reference numeral 8. A lower reflector 9, an upper reflector 10, an annular side reflector 11, and wedge shaped annular corner reflectors 12 define the outer limits of the core, lower reflector 9 serving additionally as a support for fuel spheres 8. Graphite fuel spheres 8 are loaded into the core through a plurality of loading tubes 13 penetrating the upper reflector 10 and are removed through outlet tubes 27 which penetrate through the lower reflector 9.

Lower reflector 9 is secured to a steel reflector grid 14. Grid 14 is in turn supported by a grid 15 which is carried by pressure-vessel-supported tubes 16. Apertures 17 in tubes 16 are provided so as to enable coolant gas flow to the core regions above the interiors of the tubes. The interior of each supporting tube 16 communicates with the interior of an associated access tube 18, which is provided with a removable shield plug 19.

When the reactor is in operation, an exteriorly located blower delivers a gaseous coolant through inlet 3 into an inlet plenum 20 which is defined by bottom reflector 9, the lower portion 21 of pressure vessel 2, and an annular baffle 22. The inlet gas stream is directed upwardly through bottom reflector 9, core 1, and top reflector 10 as is indicated by the arrows. After traversing top reflector 10, the gas enters a hot-gas plenum 23, which is defined by a thermally insulated baffle 24, and is directed thereby to steam generator 5 through outlet 25. After being cooled in steam generator 5, the gas is returned to the interior of the reactor through concentric inlet 6. The thus-returned cool gas flows through the space 26 around the periphery of the side reflector 11, and over the top of the hot-gas plenum 24 through space 28 to outlet 7 which communicates with the low pressure side of the blower.

Applicant's control rod system is shown in FIG. 1 in an embodiment suitable for use with the above-described reactor concept. A multiplicity of tubes 29 made of low nuclear cross section material penetrate pressure vessel 2, insulated baffle 24, upper reflector 10, core 1 and lower reflector 9. These tubes serve as guides and coolant flow channels for conventional absorption-type control rods 39. A substantially cylindrical gas-tight enclosure 30 defining a plenum 31 is mounted on the top portion of pressure vessel 2. A plurality of small penetrations 32 through pressure vessel 2 provide for free passage of low-temperature coolant gas between plenum 31 and plenum 28. Tube portions 33, indicated on FIG. 1 as those portions of tubes 29 immediately above pressure vessel 2, are penetrated by a multiplicity of circular holes 33a which provide for free passage of coolant gas between plenum 31 and the interiors of tube portions 33. Attached to the top extremity of each tube portion 33 in coaxial alignment therewith is an outwardly tapering hollow frusto-conical tube 34. Tube 34 is supported at its upper larger diameter end by a bracket 35 affixed to enclosure 30. A tube 36 communicates between the upper end of tube 34 and a gas-bearing centrifugal pump 37. A concentric tube 38 leads from pump 37 and opens into plenum 31. Inside frusto-conical tube 34 is a float 40 similar to the metering floats found in rotometers. A cable 44 connects float 40 to control rod 39. Float stop 41 and control rod stop 42 limit the lowermost float travel and the uppermost control rod travel, respectively. Adjacent to tube 34 is a position indicator 43 for indicating the float position which in turn determines a corresponding control rod position. Position indicator 43 comprises a differential transformer whose windings are spaced in such a manner so that the transformer output is indicative of the float position.

The principle of operation of the subject control rod system is similar to the principle of operation of a flow metering device called a rotometer. In operation, the pump 37 causes coolant gas from plenum 31 to flow inward through the holes 33a provided in tube portion 33, and upward through tapered tube 34. A small portion of the gas passing through tube 34 is pulled upward through tubes 29 from lower cool-gas plenum chamber 20, thereby cooling both tubes 29 and control rod 39. Excess gas pumped through tubes 29 into plenum 31 can return to the reactor coolant stream by passing through penetrations 32 into the top cool-gas plenum 28. Inside tube 34, the freely suspended float rises toward the larger end of the tapered tube to a point where there is sufficient flow through the tapered tube, and the downward force inner wall of tapered tube 34, to provide a balance between the lifting force on the float created by the coolant gas flow through the tapered tube, and the downward force exerted by the weight of the hanging control rod. The distance which the float rises in tapered tube 34 depends upon the coolant flow rate which can be varied by changes in pump speed, the degree of taper in the tapered tube 34, the float design, and the weight of the control rods which the float must support. When no fluid is flowing, the float rests on the float stop 41 and the control rods are inserted a maximum distance into the core. This is of great significance as a safety feature in a loss of power or pump failure accident wherein the pumps would stop. The system is thus seen to be fail-safe with control rod insertion and reactor shutdown taking place automatically in the event of a power outage.

An alternate method of providing the fluid flow to support the float and control rod is to take reactor coolant gas from the discharge of the reactor coolant blower, pass it upwardly through the hollow tube member and then discharge it to a lower pressure portion of the reactor coolant system. If this scheme is used for providing the necessary fluid flow through the hollow tube member, a control valve is necessary to enable the reactor operator to position the control rod by varying the fluid flow rate which determines the vertical position of the float member.

The subject control rod drive system has a great degree of flexibility to meet various reactor control requirements. Greater lengths of travel are obtainable through the use of larger capacity pumps and less taper in the tube walls. Larger capacity pumps and different float designs also satisfy increased load demands.

To further illustrate the flexibility and theory of operation of the subject invention, FIG. 2 is presented. Curves A and B represent the float response at various flow rates for two typical tapered tube sections A and B. Inasmuch as the absolute value of float position corresponding to different flow rates varies with other factors such as channel size, float design and control rod weight, no absolute values of float displacement or flow rate are indicated in FIG. 2. Tube B, having a greater degree of taper (more rapidly expanding diameter) than tube A, is characterized by a slower float response to changes in fluid flow rate. The slower float response of tube B indicates that more rapidly expanding tube sections are required when slow and accurate control rod movement is desired. It is also apparent from FIG. 2 that a composite tube section made up of several tubes having different degrees of taper can be used to give different flow response to a control rod as it passes through different vertical positions in the reactor.

The simplicity of the subject control rod system has eliminated the need for the special cooling and shielding requirements characteristic of electro-mechanical systems. The absence of contacting moving parts has eliminated the need for special lubricants which fail under temperature and radiation extremes. The elimination of a large number of electro-mechanical components as well as lubrication, cooling and shielding problems reduces system maintenance requirements and improves the system reliability.

Since many modifications of and deviations from the embodiments disclosed herein may be made without departing from the spirit and scope of the present invention, the foregoing illustrative description should not be interpreted in a limiting sense. The invention should be limited only by the claims appended hereto.

What is claimed is:

1. In a neutronic reactor having a vertically movable neutron absorbing control rod, the improved control rod drive comprising in combination a hollow tube member mounted above said control rod in coaxial alignment therewith, the internal diameter of said tube member increasing at increasing distances from said control rod, means for providing a variable fluid flow upward through said hollow tube, a float member disposed within said hollow tube member, said float member adapted to vary its vertical position in response to variations in the fluid flow rate through said hollow tube, and means coupling said float member to said control rod, whereby changes in the vertical position of said float member cause corresponding changes in the vertical position of said control rod.

2. In a neutronic reactor having a neutron absorbing control rod movable vertically within a channel passing through the reactor active region, the improved control rod drive comprising in combination an outwardly tapered tube coaxially mounted at the upper end of said channel, said outwardly tapered tube increasing in diameter at increasing distances from the upper end of said channel, fluid inlet means located at the lower end of said tapered tube, variable capacity fluid pumping means adapted to pump fluid upwardly through said tapered tube, a float member disposed within said tapered tube, said float member adapted to change its vertical position in response to variations in the fluid flow rate through said tapered tube, and connecting means communicating between said float member and said control rod, whereby vertical movement of said float member causes a corresponding vertical movement of said control rod.

3. The control rod drive of claim 2 wherein said connecting means comprises a flexible metal cable.

4. In a neutronic reactor having a neutron absorbing control rod movable vertically within a channel passing through the reactor active region, the improved control rod drive system comprising in combination an outwardly tapered tube mounted coaxially with said control rod at the upper end of said channel, said outwardly tapered tube increasing in diameter at increasing distances from the upper end of said channel, fluid inlet means located at the lower end of said tapered tube, variable capacity fluid pumping means adapted to pump fluid upwardly through said tapered tube, a float member disposed within said tapered tube, said float member adapted to change its vertical position in response to variations in the fluid flow rate through said tapered tube, means of indicating the vertical position of said float member, and connecting means communicating between said float member and said control rod, whereby vertical movement of said float member causes a corresponding vertical movement of said control rod.

5. The control rod drive system of claim 3 wherein said means of indicating the vertical position of said float member comprises a differential transformer.

No references cited.

---

UNITED STATES PATENT OFFICE
CERTIFICATE OF CORRECTION

Patent No. 3,123,532          March 3, 1964

John W. Michel

It is hereby certified that error appears in the above numbered patent requiring correction and that the said Letters Patent should read as corrected below.

Column 3, line 45, strike out "through the tapered tube, and the downward force" and insert instead -- passage between the radial float extremity and the --.

Signed and sealed this 14th day of July 1964.

(SEAL)
Attest:

ESTON G. JOHNSON
Attesting Officer

EDWARD J. BRENNER
Commissioner of Patents

UNITED STATES PATENT OFFICE
CERTIFICATE OF CORRECTION

Patent No. 3,123,532                                March 3, 1964

John W. Michel

It is hereby certified that error appears in the above numbered patent requiring correction and that the said Letters Patent should read as corrected below.

Column 3, line 45, strike out "through the tapered tube, and the downward force" and insert instead -- passage between the radial float extremity and the --.

Signed and sealed this 14th day of July 1964.

(SEAL)

Attest:

ESTON G. JOHNSON
Attesting Officer

EDWARD J. BRENNER
Commissioner of Patents